United States Patent
Arzelier et al.

(10) Patent No.: US 8,515,422 B2
(45) Date of Patent: Aug. 20, 2013

(54) DISPLAYING CHARACTERS AND IMAGES BASED ON SUPPORT

(75) Inventors: Claude Jean-Frederic Arzelier, Cannes (FR); Stephen Andrew Howell, Barnwood (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/556,979

(22) Filed: Jul. 24, 2012

(65) Prior Publication Data

US 2012/0289293 A1    Nov. 15, 2012

Related U.S. Application Data

(63) Continuation of application No. 12/941,845, filed on Nov. 8, 2010.

(30) Foreign Application Priority Data

Oct. 21, 2010   (EP) ..................................... 10290569

(51) Int. Cl.
*H04W 4/00*   (2009.01)

(52) U.S. Cl.
USPC ........................................ 455/435.1; 370/331

(58) Field of Classification Search
USPC ............. 455/566, 425.1, 425.2, 552.1, 435.1; 704/8; 370/331
See application file for complete search history.

(56) References Cited

U.S. PATENT DOCUMENTS

| 5,440,615 | A | 8/1995 | Caccuro et al. |
| 6,311,180 | B1* | 10/2001 | Fogarty .......................... 707/749 |
| 2002/0059448 | A1* | 5/2002 | Honeywood .................. 709/238 |
| 2003/0184451 | A1 | 10/2003 | Li |
| 2003/0215074 | A1* | 11/2003 | Wrobel ..................... 379/142.04 |
| 2005/0107083 | A1* | 5/2005 | Rager et al. ................ 455/435.1 |

(Continued)

FOREIGN PATENT DOCUMENTS

| DE | 19831407 A1 | 1/2000 |
| EP | 2048891 A1 | 4/2009 |

(Continued)

OTHER PUBLICATIONS

Holley, Kevin; "Re: Way Forward on CJKV Character Language Ambiguity with UCS2/NITZ."; E-mail Communication dated Aug. 12, 2010; 14 pages.

(Continued)

*Primary Examiner* — Jinsong Hu
*Assistant Examiner* — Nathan Taylor
(74) *Attorney, Agent, or Firm* — Conley Rose, P.C.; J. Robert Brown, Jr.

(57) ABSTRACT

A user equipment (UE) comprising a display and a processor configured to determine whether the UE supports each indicium of a string of one or more indicia according to a first feature, the string of one or more indicia identifying a network, the processor further configured to display on the display of the UE only the indicia in the string that are supported by the UE. A method implemented on a UE comprising determining whether the UE supports one or more indicium of a string of one or more indicia according to a first feature, the string of one or more indicia identifying a network, and displaying on the display of the UE only the indicia in the string that are supported by the UE.

6 Claims, 3 Drawing Sheets

(56) References Cited

U.S. PATENT DOCUMENTS

| | | | |
|---|---|---|---|
| 2007/0283047 A1* | 12/2007 | Theis et al. | 709/246 |
| 2007/0298795 A1* | 12/2007 | Zinn et al. | 455/435.1 |
| 2008/0020761 A1* | 1/2008 | Park | 455/434 |
| 2008/0032736 A1* | 2/2008 | Bari et al. | 455/552.1 |
| 2008/0096559 A1* | 4/2008 | Phillips et al. | 455/435.2 |
| 2008/0126077 A1* | 5/2008 | Thorn | 704/8 |
| 2009/0018816 A1* | 1/2009 | Noldus et al. | 704/8 |
| 2009/0088179 A1* | 4/2009 | Stuempert et al. | 455/456.1 |
| 2010/0099455 A1* | 4/2010 | Bari et al. | 455/553.1 |
| 2011/0032902 A1* | 2/2011 | Kim | 370/331 |
| 2012/0066237 A1* | 3/2012 | Chen et al. | 707/754 |

FOREIGN PATENT DOCUMENTS

| | | |
|---|---|---|
| GB | 2456531 A | 7/2009 |
| WO | 0004737 A1 | 1/2000 |
| WO | 2007037677 A1 | 4/2007 |
| WO | 2008065546 A1 | 6/2008 |
| WO | 2009028555 A1 | 3/2009 |

OTHER PUBLICATIONS

Arzelier, Claude Jean-Frederic; U.S. Appl. No. 12/768,590, filed Apr. 27, 2010; Title: Solving Character Display Ambiguities.

Arzelier, Claude Jean-Frederic et al.; U.S. Appl. No. 12/941,845, filed Nov. 8, 2010; Title: Displaying Characters and Images Based on Support.

International Telecommunication Union; ITU-T Telecommunication Standardization Sector of ITU; Complement to ITU-T Recommendation E.212; List of Mobile Country or Geographical Area Codes; Geneva, 2004; Jan. 1, 2004; 14 pages.

3GPP TS 24.008 v9.1.0; 3rd Generation Partnership Project; Technical Specification Group Core Network and Terminals; Mobile Radio Interface Layer 3 Specification; Core Network Protocols; Stage 3; Release 9; Dec. 2009; 595 pages.

3GPP TS 24.301 v9.1.0; 3rd Generation Partnership Project; Technical Specification Group Core Network and Terminals; Non-Access-Stratum (NAS) Protocol for Evolved Packet System (EPS); Stage 3; Release 9; Dec. 2009; 286 pages.

3GPP TS 22.101 V11.0.0; 3rd Generation Partnership Project; Technical Specification Group Services and System Aspects; Service Aspects; Service Principles; Release 11; Sep. 2010; 60 pages.

3GPP TS 23.122 V10.1.0; 3rd Generation Partnership Project; Technical Specification Group Core Network and Terminals; Non-Access-Stratum (NAS) Functions Related to Mobile Station (MS) in Idle Mode; Release 10; Sep. 2010; 41 pages.

3GPP TS 24.301 V10.0.0; 3rd Generation Partnership Project; Technical Specification Group Core Network and Terminals; Non-Access-Stratum (NAS) Protocol for Evolved Packet System (EPS); Stage 3; Release 10; Sep. 2010; 299 pages.

3GPP TS 24.008 V10.0.0; 3rd Generation Partnership Project; Technical Specification Group Core Network and Terminals; Mobile Radio Interface Layer 3 Specification; Core Network Protocols; Stage 3; Release 10; Sep. 2010; 616 pages.

3GPP TS 22.042 V9.0.0; 3rd Generation Partnership Project; Technical Specification Group Services and System Aspects; Network Identity and Timezone (NITZ); Service Description Stage 1; Release 9; Dec. 2009; 8 pages.

International Organization for Standardization/International Electrotechnical Commission; ISO/IEC Standard 10646:2011; Information Technology—Universal Coded Character Set (UCS); 2 pages.

Office Action dated Jun. 1, 2012; U.S. Appl. No. 12/768,590, filed Apr. 27, 2010; 20 pages.

Notice of Allowance dated Jun. 26, 2012; U.S. Appl. No. 12/941,845, filed Nov. 8, 2010; 26 pages.

European Extended Search Report; EP Application No. 10290179.0; Dec. 6, 2010; 6 pages.

European Examination Report; Application No. 10290179.0; Mar. 23, 2012; 19 pages.

PCT International Search Report; PCT Application No. PCT/EP2011/055193; May 13, 2011; 3 pages.

PCT Written Opinion of the International Searching Authority; PCT Application No. PCT/EP2011/055193; May 13, 2011; 5 pages.

PCT Written Opinion of the International Searching Authority; PCT Application No. PCT/EP2011/055193; Mar. 28, 2012; 5 pages.

PCT International Preliminary Report on Patentability; Application No. PCT/EP2011/05519; Jun. 21, 2012; 15 pages.

European Extended Search Report; EP Application No. 10290569.2; Mar. 9, 2011; 5 pages.

PCT International Search Report; Application No. PCT/EP2011/068325; Jan. 25, 2012; 3 pages.

PCT Written Opinion of the International Searching Authority; Application No. PCT/EP2011/068325; Jan. 25, 2012; 5 pages.

3GPP TS 22.101 V8.14.0; 3rd Generation Partnership Project; Technical Specification Group Services and System Aspects; Service Aspects; Service Principles; Release 8; Dec. 2009; 54 pages.

3GPP TS 24.008 V8.10.0; 3rd Generation Partnership Project; Technical Specification Group Core Network and Terminals; Mobile Radio Interface Layer 3 Specification; Core Network Protocols; Stage 3; Release 8; Jun. 2010; 593 pages.

Advisory Action dated Nov. 28, 2012; U.S. Appl. No. 12/768,590, filed Apr. 27, 2010; 3 pages.

PCT Written Opinion of the International Preliminary Examining Authority; Application No. PCT/EP2011/068325; Oct. 25, 2012; 5 pages.

3GPP TS 22.042 V8.0.0; 3rd Generation Partnership Project; Technical Specification Group Services and System Aspects; Network Identity and Timezone (NITZ); Service Description Stage 1; Release 8; Dec. 2008; 8 pages.

3GPP TS 24.008 V8.9.0; 3rd Generation Partnership Project; Technical Specification Group Core Network and Terminals; Mobile Radio Interface Layer 3 Specification; Core Network Protocols; Stage 3; Release 8; Mar. 2010; 591 pages.

3GPP TS 24.301 V9.2.0; 3rd Generation Partnership Project; Technical Specification Group Core Network and Terminals; Non-Access-Stratum (NAS) Protocol for Evolved Packet System (EPS); Stage 3; Release 9; Mar. 2010; 293 pages.

Final Office Action dated Sep. 25, 2012; U.S. Appl. No. 12/768,590, filed Apr. 27, 2010; 15 pages.

PCT International Preliminary Report on Patentability; Application No. PCT/EP2011/068325; Jan. 24, 2013; 12 pages.

* cited by examiner

DISPLAYING CHARACTERS AND IMAGES BASED ON SUPPORT

CROSS-REFERENCE TO RELATED APPLICATIONS

This application is a continuation of U.S. patent application Ser. No. 12/941,845 filed Nov. 8, 2010, by Claude Jean-Frederic Arzelier, entitled "Displaying Characters and Images Based on Support" (40105-US-PAT-4214-30201) which claims priority to European Patent Application No. 10290569.2 filed Oct. 21, 2010, by Claude Jean-Frederic Arzelier, entitled "Displaying Characters and Images Based on Support" (40105-EP-EPA-4214-30200), filed under 35 U.S.C. 119, which are incorporated by reference herein as if reproduced in their entirety.

BACKGROUND

As used herein, the term "user equipment" or "UE", "mobile equipment" or "ME", "mobile station" or "MS" might refer to mobile devices such as mobile telephones, personal digital assistants, handheld or laptop computers, and similar devices that have telecommunications capabilities, all of which may be used interchangeably. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module.

When a UE connects to a Public Land Mobile Network (PLMN), the PLMN typically provides network name information to the UE. The UE then typically displays on its display screen the name of the network to which it is connected. One way in which network name information can be provided to a UE is known as the Network Identity and Time Zone (NITZ) feature, in which the network sends the UE a text string coding the network name. The coding might be performed according to a Global System for Mobile Communications (GSM) default alphabet or according to International Organization for Standardization/International Electrotechnical Commission (ISO/IEC) Standard 10646, which specifies a universal character set (UCS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
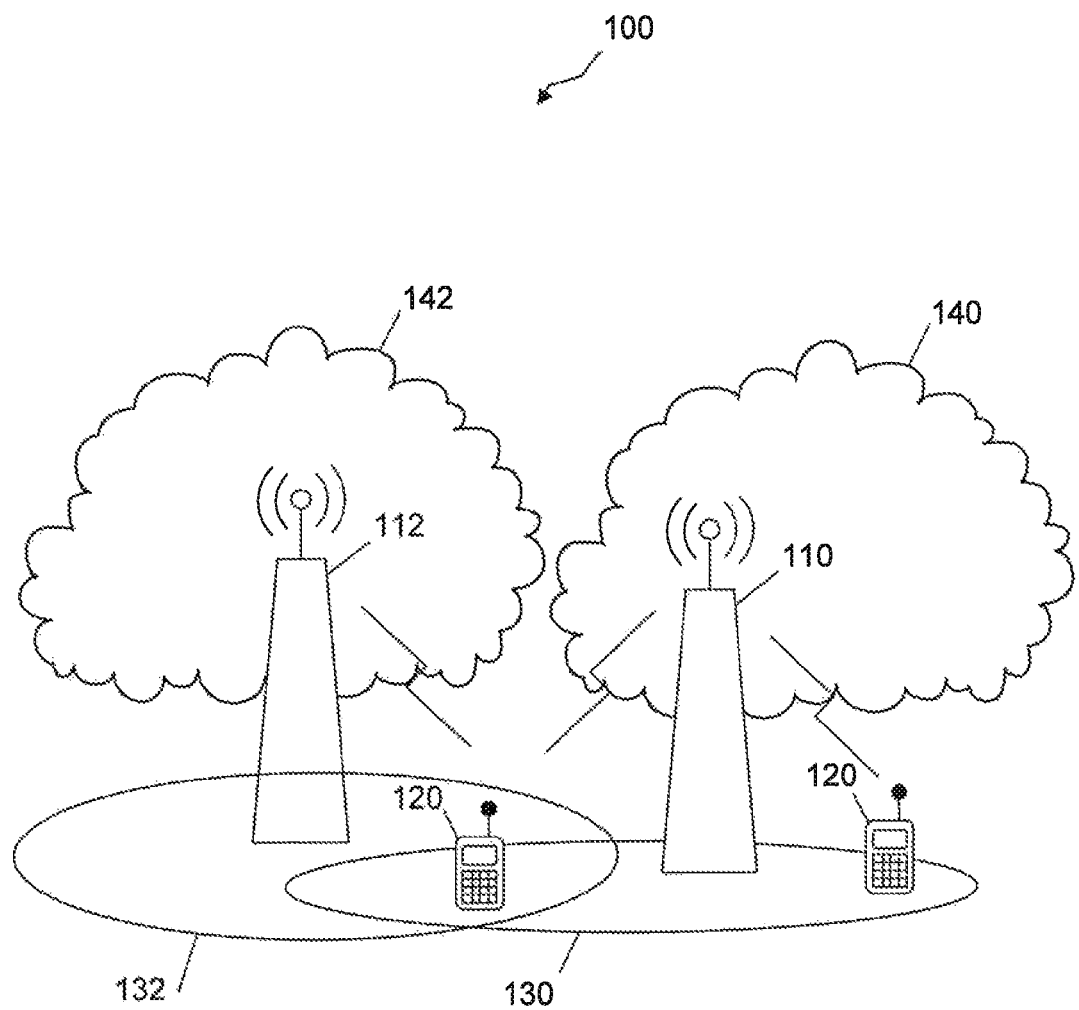
FIG. 1 is a schematic diagram of a communications system that allows a UE to communicate with at least one of other network components and devices according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A wireless network or radio access network (RAN) may provide network information to a connected UE using one of a plurality of schemes. The network information may be displayed on the UE to provide the UE's user with information about the network, such as the network name, the country name, a graphic representing the network, and/or other related information. The terms "network information", "network name information", "network identifier information", and "network identifying information" may all be used herein interchangeable to represent any information that may be used to identify the network and that may be displayed on the UE. The Third Generation Partnership Project (3GPP) Technical Specification (TS) 22.101 describes three alternative features for providing network information to a UE that connects to a PLMN. The alternative features may be implemented based on priority, where the next priority feature may be implemented if all higher priority features are not available or supported. The proposed features include 1) using information in the USIM and associated information provided by the network, 2) using Network Identity and Timezone Information (NIZT) sent from the network, and 3) using information stored in the UE or ME.

If the UE supports more than one feature for displaying the network information, the UE may use the feature with the highest priority and ignore the remaining features. Typically, using the USIM information may have a first priority and thus may be attempted first. Using the NIZT may have a second priority and may be attempted if the USIM information is not available. Using the ME information may have a third priority and thus may be implemented if both of the other two features are not available or supported. In some cases, for example when using the USIM or NIZT feature, the network may send network information to the UE that cannot be displayed properly on the UE. For example, the UE may connect to a wireless network that sends a string of characters to indicate the network name to the UE in a format that is not supported or cannot be properly displayed on the UE. Typically, in such cases, the UE may display the wrong (or "garbage") characters, such as jumbled characters, that do not provide the user of the UE with useful information.

Disclosed herein is a method and system that prevents displaying wrong or unintelligible indicia on the UE, such as during display of the network information. In an embodiment, the string of indicia may represent network identifying information. In another embodiment, the string of indicia may be any string to be decoded by the UE to display any corresponding information on the UE. The indicia may comprise one or more alpha-numeric characters, ideographs, text, partial graphics, images, other identifying indicia, characters, symbols, or combinations thereof. The method comprises skipping one or more indicia associated with network information when those indicia are in a format or of a type that are not supported by the UE. The string of indicia may be sent from the network, for instance during the use of the USIM feature or during the use of the NIZT feature (e.g. if the USIM feature is not available or supported). As such, the UE may display only the indicia received in a format or of a type supported by the UE during the use of one of the features in order to display network information. If none of the indicia are received in a format supported by the UE, all the indicia may be skipped and the feature may not be used, even if it is supported. Instead, the next available high priority feature to display network information may be attempted. Similarly, only the indicia received in a supported format may be displayed during the use of the next high priority feature. This process may be repeated until indicia associated with the network information may be properly displayed according to an available feature. In an embodiment, the UE may still skip special indicia or group of indicia if they would remain to be displayed on their own, such as space(s) " " or hyphen(s) '-', and attempt to use the next available high priority feature to display network information.

FIG. 1 illustrates an embodiment of a radio access network (RAN) 100, which may comprise a long-term evolution (LTE) or LTE-Advanced (LTE-A), as described in the 3GPP, a GSM network, a GSM Edge Radio Access Network (GE-RAN), a Universal Mobile Telecommunications System (UMTS) network, a Universal Terrestrial Radio Access Network (UTRAN), an Institute of Electrical and Electronics Engineers (IEEE) 802.11 network, a Code Division Multiple Access (CDMA2000) network or any other existing or after developed networks. In this example, an LTE or LTE-A system may include an Evolved Universal Terrestrial Radio Access Network (E-UTRAN) node B (or eNB), a wireless access point, or a similar component rather than a traditional base station. FIG. 1 is an example and may have other components or arrangements in other embodiments. In an embodiment, the RAN 100 may comprise at least one first access device 110 and at least one UE 120, both of which may be located within a cell 130. The RAN 100 may also comprise or may be coupled to a first network 140.

As used herein, the term "access device" generally refers to any component of the wireless network, such as a traditional base station, a wireless access point, or an LTE or LTE-A node B or eNB, that creates a geographical area of reception and transmission coverage allowing a UE 120 or a relay node (not shown) to access or communicate with other components in a telecommunications system, such as a second UE 120. In this document, the term "access node" and "access device" may be used interchangeably, but it is understood that an access node may comprise a plurality of hardware and software components.

The first access device 110 may communicate with any UE 120 within the same cell 130, directly via a direct link, such as in a UTRAN. The cell 130 may be a geographical area of reception and transmission coverage. For instance, the direct link may be a point-to-point link established between the first access device 110 and the UE 120 and used to transmit and receive signals between the two. The UE 120 may or may not be registered to a network, and may attempt to display information on one or more network name, for example using a "manual PLMN selection mode" as defined in 3GPP TS 23.122. Alternatively the UE may attempt to display information on one or more network name using an "automatic PLMN selection mode" as describe in 3GPP TS 23.122. Alternatively, the first access devices 110 may communicate with any UE 120 in the same cell 130 over shared links, such as in an E-UTRAN. For instance, the shared links may comprise an uplink shared channel and a downlink shared channel. Additionally, the first access device 110 may communicate with other components or devices to provide for the components of the RAN 100 access to any other network, for instance using similar or different network protocols or technologies. In an embodiment, the UEs 120 may move about between different cells 130 and their communications may be handed-over between the different cells 130, where the UEs 120 may communicate with different access devices.

The first access device 110 may also allow the UEs 120 to communicate with at least one provisioning server 145, which may be located at or coupled to the first network 140. The first network 140 may comprise a wireless network, a wired network, or a combination of any wired or wireless networks. The networks may include any combination of a Wireless LAN (WLAN) network, an Ethernet based network, an Internet Protocol (IP) based network, a Digital Subscriber Line (DSL) network, an Optical communications network, or any other wireless or wired networks that may be used to exchange communications/data with the UE 120.

In an embodiment, the RAN 100 may also comprise a second access device 112 and/or a second network 142. The second access device 112 may be configured similar to the first access device 110 and the second network 142 may any wired or wireless networks similar to the first network 140. The UE 120 may connect to the second network 142 via the second access device 112, which may be located within the same cell 132 with the UE 120. The UE 120 may connect to both the first network 140 and the second network 142 or may select which one of the two networks to connect to (e.g. via a corresponding access device). In another embodiment, the RAN 100 may comprise two or more second access devices 112 and/or two or more second networks 142, various types of hybrid or mixed network configurations are also not excluded, for example shared networks, equivalent PLMNs, or multi-operator Core Network (MOCN).

In an embodiment, the UE 120 may be configured to receive network information from the first access device 110 or the first network 140, for instance when the UE 120 establishes a connection with the first access device 110 or the first network 140. Alternatively, network information may have been provided before the UE 120 establishes a connection with the first access device 110 or the first network 140. For example, in the case of using the USIM feature, the relevant information may have been provided previously by the Home PLMN and then re-used at a later time by the UE 120 when the UE 120 is camped on the Home PLMN. Alternatively, the relevant information may have been provided previously by the Home PLMN and then re-used at a later time by the UE 120 when the UE 120 is camped on a Visited PLMN.

The network information may include any combination of network name, country name, location area, network associated graphic (e.g. logo), or similar information that may allow the UE's user to distinguish the network connected to the UE 120. The network information may be sent in a string of indicia that comprise alphabetical characters, numerical characters, symbol characters, ideographs, characters (code) that display a graphic on the UE, or combinations thereof. Thus, the user may view the network information displayed on the UE 120 and decide whether to remain connected to the indicated network or to connect instead to a different network.

Based on the USIM feature, the UE 120 may be configured to receive and store network information in the USIM, which may correspond to a plurality of available networks. Subsequently, the UE 120 may receive specific information from the first network 140 (after establishing a connection with the network) and match this information to the information stored in the USIM to display information about the relevant network. For instance, the UE 120 may receive from a Home PLMN one or more strings of indicia or code and one or more corresponding PLMN identifiers (IDs). The PLMN ID may comprise a Mobile Country Code (MCC), a Mobile Network Code (MNC), a Location Area ID (LAI), or combinations thereof. The UE 120 may also receive a PLMN ID for the connected network (or for a plurality of networks that may be within range of the UE 120) in a network broadcast channel (BCCH). Thus, the UE 120 may match the PLMN ID in the BCCH with one of the PLMN IDs stored in the USIM and display text and/or graphic based on the string of indicia in the USIM that corresponds to the PLMN ID.

The string of indicia may be used by the UE 120 to display network name and/or related information. However, the UE 120 may skip one or more indicia in the string where those indicia may not be properly displayed, for instance as intended by the network. The skipped indicia in the string may be intended to be displayed in a specific font or format that is not supported or recognized by the UE 120, such as when the UE 120 is used in another country other than the UE's 120 country of origin or country where the UE 120 is regularly used. For example, the UE 120 may be configured to display indicia only in English font types but not in Chinese font types, and thus the UE 120 may not properly display a network name in an intended Chinese font type when the UE 120 is connected to a network in China. In such case, the UE may skip all the indicia that correspond to a font or format that is not supported or recognized by the UE 120 and display only the indicia in the string that correspond to a font or format supported by the UE 120. Thus, the UE 120 may not display any indicia in order to avoid displaying incorrect indicia, such as unintelligible text and/or graphic.

Avoiding displaying the incorrect or unintelligible indicia eliminates confusion by the user and improves the overall user interface experience. For instance, the UE 120 may display a network graphic or logo related to supported indicia in the string but skip the network name when the related indicia is in an unsupported or unrecognized font. In an embodiment, the UE may skip indicia that represent one or more unsupported pixels of a graphic. For instance, a portion of the graphic that comprise only supported pixel formats may be displayed while the remaining unsupported pixel formats of the graphic may be displayed, which may be referred to herein as "partial graphics".

If the UE 120 skips all the indicia in the string, and thus does not display any text and graphic represented in the string, then the UE may skip using the USIM feature altogether and attempt to use the next higher priority feature, which may be the NIZT feature. Based on the NIZT feature, the UE 120 may be configured to receive a string of indicia or code that indicates the network name to be displayed. The string of indicia may be sent by a Mobile Switching Centre (MSC), a Serving General packet radio service (GPRS) Support Node (SGSN) or a Mobility Management Entity (MME), e.g. via the RAN 100. For instance, the string may be sent in a second generation (2G) or third generation (3G) network in a message Mobility Management (MM) information or GPRS MM (GMM) information, respectively, according to 3GPP TS 24.008. Alternatively, the string may be sent in a LTE in a message Evolved Packet System (EPS) MM (or EMM) information, according to 3GPP TS 24.301.

The UE 120 may handle the display of indicia during the use of the NIZT feature in a similar manner to the case of the USIM feature. As such, the UE 120 may skip one or more indicia in the string when those indicia are not supported and might not display properly on the UE 120. If the UE 120 skips all the indicia in the string and thus does not display any text (and/or graphic), then the UE may skip using the NIZT feature altogether and attempt to use the next higher priority feature, which may be using the stored ME information. Based on the stored ME information feature, the UE 120 may be configured to match the PLMN ID received in the BCCH with one of the PLMN IDs stored in the UE and display text and/or graphic based on a locally stored string of indicia that corresponds to the PLMN ID. The UE's stored information may be fully recognized by the UE, and thus the UE may be capable of using this feature to display properly all the indicia, such as in the form of text and/or graphics.

In other embodiments, the UE may also be configured to use additional features to display network information. The UE may attempt to use the additional features or features in order of priority and handle the display of indicia in a manner similar to the case of the USIM and NIZT features above. For instance, the UE 120 may also be configured to use a fourth network information display feature that displays the PLMN ID received over the BCCH, which may have a lower priority than the three features above. If the UE 120 is unable to use the stored ME information feature for any reason, such as if no PLMN ID match is found in the stored information, then the UE 120 may use the fourth feature and only display indicia that are recognized or supported.

In one example, the UE 120 may use a country ID and/or PLMN ID to indicate which PLMN the UE 120 is connected to. This may allow the user to know when the UE 120 is in "roaming" mode and is connected to a PLMN of the user's choice. The UE 120 may use the PLMN ID when more than one PLMN may be available in the area. The UE 120 may use the PLMN ID to display the corresponding PLMN name. The PLMN name may be stored on the UE and associated with a PLMN ID that comprises a combination of MCC and MNC received on a broadcast channel. The PLMN name may be received in the NITZ, for example according to 3GPP TS 22.042, which may be used by the UE 120 instead of an available PLMN name stored on the UE. The PLMN name may be stored in the USIM in text and/or graphic format and associated with a PLMN ID that comprises a combination of MCC, MNC, and optionally LAI received on a broadcast channel. The USIM may store about 10 PLMN IDs for which the same name may be displayed. In this case, the UE 120 may use the PLMN name in the USIM instead an available PLMN name in the NITZ or a PLMN name stored on the UE.

However, if the UE 120 is unable to display properly one or more indicia in the USIM, for example if the UE 120 does not support a language font or symbol of the PLMN name, then in that case the UE 120 may not display those indicia of the PLMN name. If the UE 120 skips all the indicia of the PLMN name in the USIM and is also unable to display any graphic that may be indicated in the USIM, then the UE 120 may attempt to display the PLMN name in the NITZ. Similarly, if the UE 120 is unable to display properly one or more indicia in the NITZ, then the UE 120 may skip displaying those indicia of the PLMN name. If the UE 120 skips all the indicia of the PLMN name in the NITZ, then the UE 120 may display the PLMN name stored on the UE.

Figure 2:
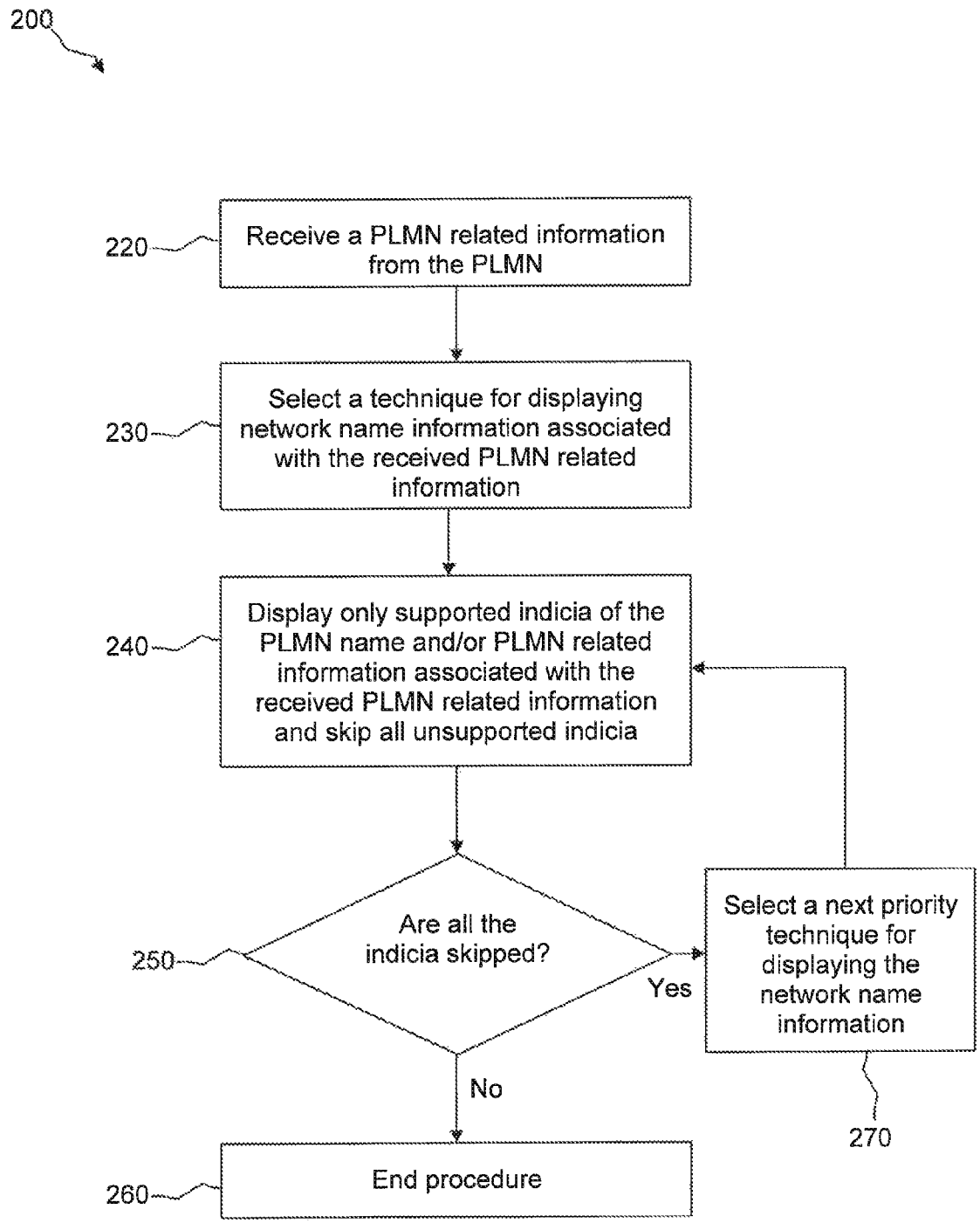
FIG. 2 is a block diagram of a method for skipping unsupported characters according to an embodiment of the disclosure.

FIG. 2 illustrates an embodiment of a method 200 for skipping and not displaying unsupported indicia during using a network information display feature. Alternatively, the method 200 may be implemented for skipping and not displaying unsupported indicia in a string (e.g. text string) to be decoded on the UE 120 to display information on the UE. The method 200 may be implemented on a UE 120. At block 220, the UE may receive PLMN related information, which may comprise a PLMN ID and/or other PLMN identifying network information, from the PLMN or other system. For example, the UE 120 may receive the PLMN ID or other information from a BCCH based on a communication established with the first access device 110 or the RAN 100. At block 230, the UE may select a feature related to displaying network name information associated with the received PLMN related information. For instance, the UE 102 may attempt to use the USIM feature or other feature that has the highest priority among a plurality of supported features.

At block 240, the UE may display only the indicia of the PLMN name and/or related PLMN information associated with the received PLMN related information, such as characters or partial graphics, that are supported by the UE and skip all unsupported indicia. For example, the UE 120 may use only the recognized indicia in the USIM to display the PLMN name and/or graphic and skip unrecognized indicia that may have unsupported language font or format, for example. At block 250, the UE may verify whether all the indicia are skipped. If all the indicia are skipped, then the UE may proceed to block 270, where the UE may select a next priority feature for displaying the network name information. For example, the UE 120 may attempt to implement displaying the network name information based on the NIZT feature, which may have the next priority after the USIM features. After block 270, the UE may return to block 240 to handle the indicia as in the previous features. If the condition in block 250 is not true, for example if the UE 120 displayed one or more indicia properly, the UE may proceed to block 260, where the procedure may end.

Figure 3:
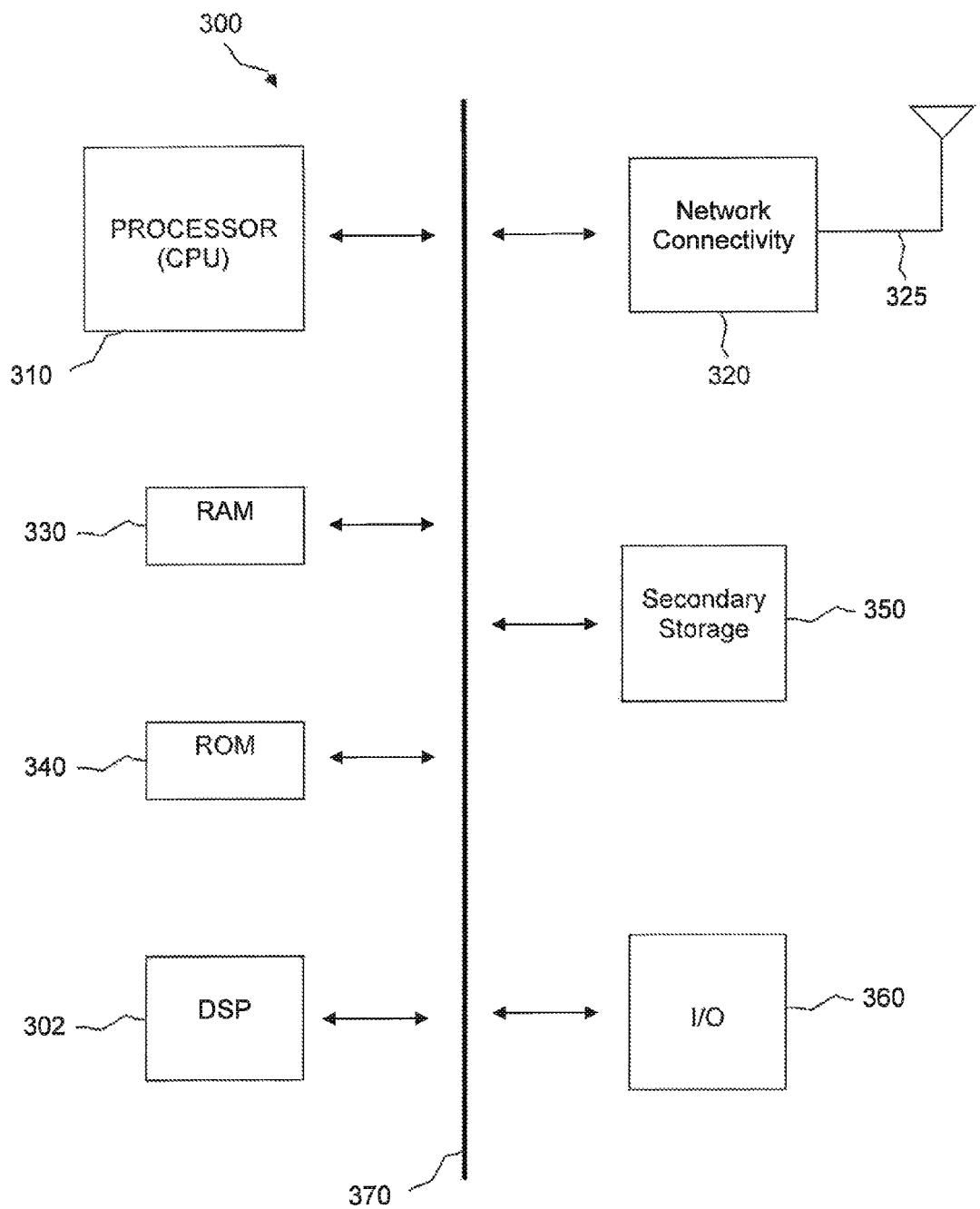
FIG. 3 illustrates a processor and related components suitable for implementing the several embodiments of the present disclosure.

The UE described above might include a processing component that is capable of executing instructions related to the actions described above. FIG. 3 illustrates an example of a system 300 that includes a processing component 310 suitable for implementing one or more embodiments disclosed herein. In addition to the processor 310 (which may be referred to as a central processor unit or CPU), the system 300 might include network connectivity devices 320, random access memory (RAM) 330, read only memory (ROM) 340, secondary storage 350, and input/output (I/O) devices 360. These components might communicate with one another via a bus 370. In some cases, some of these components may not be present or may be combined in various combinations with one another or with other components not shown. These components might be located in a single physical entity or in more than one physical entity. Any actions described herein as being taken by the processor 310 might be taken by the processor 310 alone or by the processor 310 in conjunction with one or more components shown or not shown in the drawing, such as a digital signal processor (DSP) 380. Although the DSP 380 is shown as a separate component, the DSP 380 might be incorporated into the processor 310.

The processor 310 executes instructions, codes, computer programs, or scripts that it might access from the network connectivity devices 320, RAM 330, ROM 340, or secondary storage 350 (which might include various disk-based systems such as hard disk, floppy disk, or optical disk). While only one CPU 310 is shown, multiple processors may be present. Thus, while instructions may be discussed as being executed by a processor, the instructions may be executed simultaneously, serially, or otherwise by one or multiple processors. The processor 310 may be implemented as one or more CPU chips.

The network connectivity devices 320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as CDMA (e.g. CDMA2000) devices, GSM radio transceiver devices, worldwide interoperability for microwave access (WiMAX) devices, UMTS Terrestrial Radio Access System (UTRA), Evolved UMTS Terrestrial Radio Access System (E-UTRA), 3G Long Term evolution (LTE), GSM Edge Radio Access System (GERAN), and/or other well-known devices for connecting to networks. These network connectivity devices 320 may enable the processor 310 to communicate with the Internet or one or more telecommunications networks or other networks from which the processor 310 might receive information or to which the processor 310 might output information. The network connectivity devices 320 might also include one or more transceiver components 325 capable of transmitting and/or receiving data wirelessly.

The RAM 330 might be used to store volatile data and perhaps to store instructions that are executed by the processor 310. The ROM 340 is a non-volatile memory device that typically has a smaller memory capacity than the memory capacity of the secondary storage 350. ROM 340 might be used to store instructions and perhaps data that are read during execution of the instructions. Access to both RAM 330 and ROM 340 is typically faster than to secondary storage 350. The secondary storage 350 is typically comprised of one or more disk drives or tape drives and might be used for non-volatile storage of data or as an over-flow data storage device if RAM 330 is not large enough to hold all working data. Secondary storage 350 may be used to store programs that are loaded into RAM 330 when such programs are selected for execution.

The I/O devices 360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 325 might be considered to be a component of the I/O devices 360 instead of or in addition to being a component of the network connectivity devices 320.

The following are incorporated herein by reference for all purposes: 3GPP TS 22.101, 3GPP TS 24.008, 3GPP TS 24.301, 3GPP TS 22.042, and 3GPP TS 23.122.

In an embodiment, a UE is provided. The UE includes a display and a processor configured to determine whether the UE supports each indicium of a string of one or more indicia according to a first feature, the string of one or more indicia identifying a network, the processor further configured to display on the display of the UE only the indicia in the string that are supported by the UE.

In another embodiment, a method that is implemented on a UE is provided. The method includes determining whether the UE supports one or more indicium of a string of one or more indicia according to a first feature, the string of one or more indicia identifying a network, and displaying on the display of the UE only the indicia in the string that are supported by the UE.

The UE is further configured to attempt to display information indentifying the network according to a second feature having priority after the first feature if none of the indicia in the string are displayed.

The UE is further configured to still skip special indicia or group of indicia, including space(s) " " or hyphen(s) '-', if they remain to be displayed on their own, and attempt to use a second feature having priority after the first feature to display network information.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented on a user equipment (UE) comprising:

receiving a string of indicia identifying a network, the string having both at least one supported indicium and at least one non-supported indicium;

determining whether the UE supports one or more indicium of the string of indicia;

displaying on the display of the UE only characters corresponding to those indicia in the string that are supported by the UE; and skipping display of characters corresponding to non-supported indicia, wherein the string of indicia is based on a Network Identity and Timezone information (NITZ) feature, and wherein each indicium in the string that is not supported does not correspond to a language configuration of the UE.

2. The method of claim 1, wherein a character coding is performed according to a Global System for Mobile Communications (GSM) default alphabet or according to an International Organization for Standardization/International Electrotechnical Commission (ISO/IEC) Standard 10646, wherein the ISO/IEC Standard 10646 was in effect before November, 2010.

3. A user equipment (UE) comprising:

a processor configured to:

receive a string of indicia identifying a network, the string having both at least one supported indicium and at least one non-supported indicium;

determine whether the UE supports one or more indicium of the string of indicia;

display on the display of the UE only characters corresponding to those indicia in the string that are supported by the UE; and skip display of characters corresponding to non-supported indicia, wherein the string of indicia is based on a Network Identity and Timezone Information (NITZ) feature, and wherein each indicium in the string that is not supported does not correspond to a language configuration of the UE.

4. The UE of claim 3, wherein a character coding is performed according to a Global System for Mobile Communications (GSM) default alphabet or according to an International Organization for Standardization/International Electrotechnical Commission (ISO/IEC) Standard 10646, wherein the ISO/IEC Standard 10646 was in effect before November, 2010.

5. A non-transitory computer readable medium maintaining instructions that when executed by a processor perform a method comprising:

receiving a string of indicia identifying a network, the string having both at least one supported indicium and at least one non-supported indicium;

determining whether the UE supports one or more indicium of the string of indicia; displaying on the display of the UE only characters corresponding to those indicia in the string that are supported by the UE; and skipping display of characters corresponding to non-supported indicia, wherein the string of indicia is based on a Network Identity and Timezone Information (NITZ) feature, and wherein each indicium in the string that is not supported does not correspond to a language configuration of the UE.

6. The computer readable medium of claim 5, wherein a character coding is performed according to a Global System for Mobile Communications (GSM) default alphabet or according to an International Organization for Standardization/International Electrotechnical Commission (ISO/IEC) Standard 10646, wherein the ISO/IEC Standard 10646 was in effect before November, 2010.

* * * * *

UNITED STATES PATENT AND TRADEMARK OFFICE
CERTIFICATE OF CORRECTION

PATENT NO. : 8,515,422 B2
APPLICATION NO. : 13/556979
DATED : August 20, 2013
INVENTOR(S) : Arzelier et al.

Page 1 of 1

It is certified that error appears in the above-identified patent and that said Letters Patent is hereby corrected as shown below:

In the Claims

Claim 1, Column 9, Line 26, replace "information" with -- "Information" --

Signed and Sealed this
Fifteenth Day of October, 2013

Teresa Stanek Rea
*Deputy Director of the United States Patent and Trademark Office*